United States Patent [19]

Keenan

[11] Patent Number: 5,328,353
[45] Date of Patent: Jul. 12, 1994

[54] MARINE OIL POLLUTION FIRE FENCE

[75] Inventor: Alexander J. Keenan, Anchorage, Ak.

[73] Assignee: Atlantic Richfield Company, Los Angeles, Calif.

[21] Appl. No.: 33,216

[22] Filed: Mar. 18, 1993

[51] Int. Cl.⁵ ............................................. F23D 14/00
[52] U.S. Cl. ............................................ 431/2; 431/1; 431/202; 431/266; 431/344; 210/774; 210/922
[58] Field of Search ............... 431/266, 344, 2, 202; 210/922, 923, 924, 774, 175, 242.1, 776, 242.3; 441/14; 116/107, 202, 206, 207

[56] References Cited

U.S. PATENT DOCUMENTS

| 125,096 | 3/1872 | Stevens | 441/14 |
| 3,137,872 | 6/1964 | Edwards et al. | 441/14 |
| 3,586,469 | 6/1971 | Moline | 431/8 |
| 3,614,417 | 10/1971 | Sanford | 362/415 |
| 4,308,006 | 12/1981 | Koblanski | 431/8 X |
| 4,576,569 | 3/1986 | Koblanski | 431/2 X |
| 4,669,972 | 6/1987 | Koblanski | 431/2 |
| 5,057,004 | 10/1991 | McAllister | 431/8 X |

FOREIGN PATENT DOCUMENTS 2854088 7/1980 Fed. Rep. of Germany ...... 210/922

Primary Examiner—Carl D. Price
Attorney, Agent, or Firm—Michael E. Martin

[57] ABSTRACT

Oil pollution floating on a body of water is abated or contained by a fire fence generated by a series of devices which are interconnected by cables and anchored to form a barrier line. Each device comprises a buoy connected to a depending, negatively-buoyant tank of pressurized combustion gas and a burner nozzle disposed for providing a pilot flame near the water's surface to ignite an oil slick thereon. The pilot flame way be controlled to sustain combustion of the floating oil and dissipation of same.

6 Claims, 1 Drawing Sheet

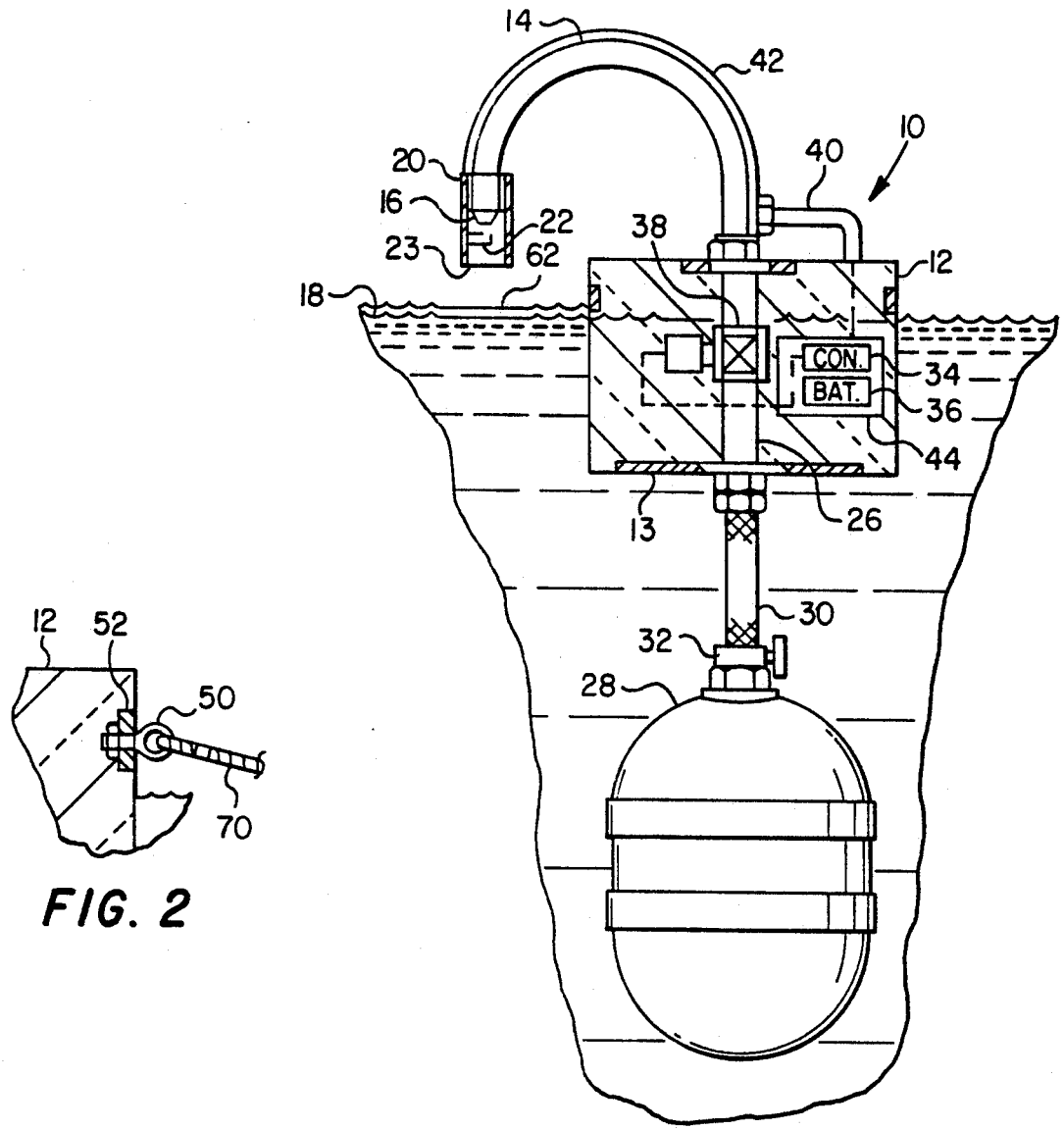
FIG. 1
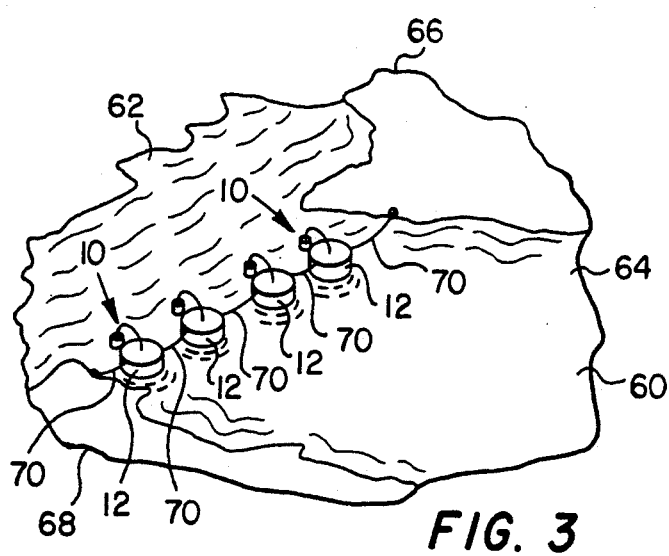
FIG. 2
FIG. 3

MARINE OIL POLLUTION FIRE FENCE

BACKGROUND OF THE INVENTION

1. Field of the Invention

The present invention pertains to a device and system for containing and abating a marine oil spill characterized by plural interconnected floating flame starters for burning and containing an oil slick.

2. Background

The containment and abatement of marine oil spills and other sources of marine oil pollution continue to be vexing problems. Many marine oil slicks may be abated by combustion of the oil. However, crude oils, in particular, may not sustain combustion over the entire area of the slick due to wind and wave action and due to the composition of the oil itself. However, combustion of marine oil slicks is one of the most complete and least capital intensive methods of abating and containing marine oil pollution. In this regard, a unique device, system and method have been developed for containing and abating oil spills and other sources of marine oil pollution by generating a fire fence or combustion zone to eliminate oil on the water's surface and to contain the spread of an oil slick.

SUMMARY OF THE INVENTION

The present invention provides a unique device, system and method for containing and abating marine oil pollution wherein a plurality of floating, self-contained burners are interconnected and anchored at the edge of an oil slick or an area to be protected and comprise a source of ignition for burning floating oil.

In accordance with one aspect of the present invention, a device is provided which includes a burner head, a buoyant support for the burner head and a source of fuel for generating a pilot flame to ignite floating oil and similar combustible pollutants on the water's surface. The device includes a floating, fire-resistant vessel or buoy which supports a burner head, a control circuit for controlling the flow of fuel to the burner head and an ignitor for igniting the fuel and a self-contained fuel tank which, preferably, is suspended from the vessel and also functions to stabilize the device when disposed in the water.

In accordance with another important aspect of the present invention, a plurality of the devices of the invention are interconnected to form a system which will sustain the ignition of the fringe of an oil slick to form a fire fence which will contain and abate the slick and prevent its incursion into a predetermined area.

In accordance with yet a further aspect of the present invention, an improved method of containing and abating marine oil pollution is provided by the deployment of a unique set of flame generators or sources which will form a fire barrier to the spread of an oil slick while concomitantly abating or eliminating the oil slick.

Those skilled in the art will recognize certain superior features and other advantages of the present invention upon reading the detailed description which follows.

BRIEF DESCRIPTION OF THE DRAWING

FIG. 1 is a side elevation, partially sectioned showing one of the oil pollutant ignition and flame-sustaining devices of the present invention;

FIG. 2 is a detail section view of the device of FIG. 1 showing a typical mooring connection; and FIG. 3 is a perspective view of a portion of a body of water on which the system of plural devices of the present invention is deployed for creating a fire fence to burn a floating oil slick.

DESCRIPTION OF PREFERRED EMBODIMENTS

In the description which follows, like elements are marked throughout the specification and drawing with the same reference numerals, respectively. The drawing figures are not necessarily to scale and certain features are shown in generalized or schematic form in the interest of clarity and conciseness.

Referring to FIG. 1, there is illustrated a unique device, generally designated by the numeral 10, for providing a source of ignition and flame sustentation for a marine oil spill. The device 10 is characterized by a buoyant vessel or buoy member generally designated by the numeral 12 which may be of generally rectangular or cylindrical shape and which is formed of a suitable fire resistant and buoyant material such as compacted sintered pumice or glass particles which are suitably resistant to fire when exposed directly thereto. The buoy member 12 supports a curved conduit 14 having a burner nozzle 16 disposed on the distal end thereof and in proximity to the water surface 18. The nozzle 16 is disposed in a generally cylindrical tubular flame shield 20 and also in proximity to a spark ignitor 22 whereby, in response to conducting a suitable gaseous fuel through the conduit 14, a sustained or intermittent flame may be generated at the distal end 23 of the flame shield for igniting oil floating on the water surface 18 or sustaining the combustion of such oil.

As shown in FIG. 1, the buoy member 12 includes a conduit 26 extending therethrough from the burner conduit 14 to a source of gaseous fuel disposed below the buoy member and comprising a suitable pressure vessel or tank 28. The tank 28 is connected to the buoy member 12 by a reinforced flexible conduit or hose 30 and a suitable pressure regulator 32 is interposed between the tank 28 and the burner nozzle 16 for regulating the pressure of gaseous fuel stored in the tank as it is conducted through the conduits 30, 26 and 14 to the burner nozzle. The tank 28 may be of suitable reinforced metal to withstand the pressure of a suitable quantity of gaseous fuel stored therein such as propane, butane or natural gas. The tank 28 may be suitably weighted such that it is slightly negatively buoyant when empty. In this way, the device 10 is stabilized by the depending tank 28 and its tether or connecting hose 30 even when the tank is empty or slightly depleted. The buoy member 12 is, of course, sufficiently buoyant to support the tank 28 when it is full of fuel.

The device 10 preferably includes an on-board control system and electrical energy source such as indicated at numerals 34 and 36, respectively. A suitable energy source, such as a battery 36, is operable through a control circuit 34 to provide energy for opening and closing a solenoid operated valve 38 interposed in the conduit 26 and for generating a timed ignition spark at the ignitor 22, for example. The device 10 may be provided with a control circuit 34 which will intermittently open the valve 38 and generate a flame igniting spark at the ignitor 22, say at one minute intervals, for example. Other timed sequences or periods of ignition may be provided by the control circuit 34. The control circuit 34 may also be remotely controlled by suitable radio operated switches or the like, not shown. Conductors leading to the ignitor 22 may be routed through suitable conduit means 40, 42, as shown in FIG. 1. The control circuit 34 and the battery 36 may be disposed in a suitable enclosure 44 disposed in the buoy member 12 and suitably insulated from the extreme temperatures to which the device 10 may be exposed when floating in burning oil. The buoy member 12 may be provided with opposed mooring eyes 50, one shown in FIG. 2 suitably secured to a metal band 52 to alleviate tension forces on the body of the buoy member. The valve 38 and the enclosure 44 are preferably disposed at or near the bottom side 13 of the buoy member 12 for easy access thereto and to minimize exposure to heat from burning oil on the water surface.

As shown in FIG. 3, a plurality of the devices 10 may be deployed in a body of water 60 in such a way that an oil slick 62 floating on the body of water may be contained and abated by igniting the burners of each of the devices 10 to create a fire fence. As shown in FIG. 3, a bay or cove 64 formed between two land masses 66 and 68 may be kept free of the oil slick 62 by deploying a system characterized by a plurality of the devices 10 interconnected by suitable mooring cables 70 and also moored at opposite ends to the shores of the land masses 66 and 68. Upon ignition of each of the devices 10, a fire fence may be created across the mouth of the bay 64 to prevent the oil slick 62 from migrating into the bay. Of course, a system comprising any number of the devices 10 interconnected by mooring cables 70 may be deployed in the open sea and suitably anchored at opposite ends by suitable sea anchors or other means, not shown, to form a fire fence to contain or prevent the migration of an oil slick.

Accordingly, when an oil slick is detected and its spread is desired to be prevented, a suitable number of the devices 10 may be deployed from a suitable aircraft or launch and recovery ship, not shown, individually or interconnected to each other and strung out to form a barrier or fence for an oil slick. The size of the device 10 and its fuel tank 28 may be determined by the expected "burn" time of the device. The tank 28 may, for example, be sized to accept from 2 gallons to 20 gallons of fuel. The smaller size may be more suitable for low altitude aircraft deployment. Once the interconnected devices 10 have been deployed in the body of water to be rid of an oil slick, the individual burners of each device 10 may be ignited by remote control or by a predetermined, preset control to periodically or continuously provide a pilot flame to ignite the oil floating on the water surface. Thanks to the location of the fuel tank 28 of each of the devices 10, the floating buoy members 12 and their burner nozzles 16 are stabilized in proximity to the floating oil slick and the source of fuel is suitably removed from the vicinity of burning oil.

The device 10 may, of course, be constructed of suitable fire-resistant metals such as stainless steel for the conduits and components which are likely to be exposed to elevated temperatures. The buoy member 12 is desirably made of a buoyant fire-resistant material described hereinbefore but may be formed of steel or more conventional materials of construction for floating vessels which are capable of continued exposure to flame. The cables 70 should, of course, be of high-strength steel or suitable fire-resistant material.

Although preferred embodiments of the present invention are described hereinabove, those skilled in the art will recognize that various substitutions and modifications may be made to the invention without departing from the scope and spirit of the appended claims.

What is claimed is:

1. A device for igniting oil floating on the surface of a body of water comprising:
   a buoyant member comprising a support for a combustion fuel conduit;
   a combustion fuel conduit mounted on said buoyant member and having a fuel dispensing nozzle end disposed in proximity to the surface of a body of water and oil floating thereon when said device is deployed in said body of water;
   an ignitor for igniting fuel emanating from said nozzle to form a pilot flame for igniting said oil floating on said body of water; and
   a source of fluid combustion fuel comprising a negatively buoyant fuel tank depending from said buoyant member below said surface of said body of water and connected to said buoyant member.

2. The device set forth in claim 1 wherein:
   said buoyant member is formed of a flame-resistant, non-metal material.

3. The device set forth in claim 2 wherein:
   said buoyant member is formed of pumice.

4. The device set forth in claim 1 including:
   a control circuit disposed on said buoyant member and operable to provide a source of ignition for igniting combustion fuel emanating from said nozzle, said control circuit being operable to periodically ignite a flame at said nozzle to sustain combustion of said oil floating on said body of water.

5. A system for containing and/or abating an oil slick on the surface of a body of water characterized by:
   a plurality of ignition devices interconnected with each other and suitably anchored in a body of water to form a fire fence to prevent spreading of an oil slick beyond a perimeter line formed by said devices, said devices each being characterized by a buoyant member, a source of fluid fuel comprising a tank connected to said buoyant member and depending from said buoyant member below said surface of said body of water, and a pilot flame generator including a conduit supported on said buoyant member and in fluid flow communication with said tank, a fuel-dispensing nozzle and means for igniting fuel dispensed from said nozzle and in proximity to the water surface for igniting oil floating on said body of water; and
   cable means interconnecting each of said devices to form said fence.

6. A method of containing and abating an oil slick on the surface of a body of water comprising:
   providing a plurality of oil-igniting devices operable to be interconnected with each other to form a barrier to spread of said slick by igniting and burning said oil, each of said devices including a buoyant member, a source of fluid fuel comprising a tank connected to said buoyant member and depending from said buoyant member below said surface of said body of water when said devices are deployed in said body of water, and a burner including conduit means for receiving fuel from said tank and disposed for igniting oil floating on said surface of said body of water;
   deploying a plurality of said devices onto said body of water and interconnected with each other by flexible cable means; and
   causing each of said devices to at least periodically generate a pilot flame for igniting oil floating on said body of water.

* * * * *